INVENTORS.
ADOLPH SEIDEL
ARTHUR H. SCHLOZ
Horace B. Fay
ATTORNEY.

May 25, 1943.  A. SEIDEL ET AL  2,320,103
KNUCKLE JOINT PRESS
Filed March 9, 1939   2 Sheets-Sheet 2

INVENTORS.
ADOLPH SEIDEL
ARTHUR H. SCHLOZ
BY Horace B. Fay
ATTORNEY.

Patented May 25, 1943

2,320,103

UNITED STATES PATENT OFFICE 2,320,103

KNUCKLE JOINT PRESS

Adolph Seidel and Arthur H. Schloz, Toledo, Ohio, assignors to E. W. Bliss Company, Brooklyn, N. Y., a corporation of Delaware Application March 9, 1939, Serial No. 260,814

13 Claims. (Cl. 78—41)

This invention relates to an improved knuckle joint or toggle press and is particularly directed to an improved crown construction in such a press with improved features for positioning and supporting the link supporting block with respect to the frame of the press.

In presses of this type heretofore built, there has been provided an adjusting wedge interposed between the block and crown and extending transversely of the crankshaft, namely from front to back with relation to the press frame. This wedge has been provided to permit adjustment of the block with respect to the crown, which adjustment was normally effected by an adjusting screw extending from front to back of the press parallel to the wedge, with a consequent positioning of the screw actuating mechanism, either inconveniently in front of the die opening between the operator and the press or behind the press where it was not easily accessible. Further, wedges of this type were so positioned that if the operating pressure of the parts should cause the lug connecting the screw and wedge to break, the wedge could be forced out of position with the speed of a projectile, resulting in damage to the press and injury to any workman who was in its path.

Presses of this general nature have usually included a spring suspension for the block which permitted adjusting the block with respect to the crown. This spring suspension normally allowed the block to move with respect to the frame, its positive upward movement being limited by the wedge and crown and its positive downward movement only by the position of the toggle links. This permitted some movement of the parts during operation and recurrent banging of the blocks against the wedge and crown which resulted in an unsatisfactory tool and which was susceptible to breakage over a period of time. This has been especially true when a further motion, as a knockout, was incorporated in the press. Here the vibration was aggravated with the result that the parts more rapidly jarred out of adjustment.

Other disadvantages arose from the prior constructions outlined above and it has been the general object of our invention to overcome these undesirable characteristics and provide an improved machine tool. More specifically it has been our object to provide a spring supported block which may be locked to the crown to eliminate all motion of the block with respect to the frame except during adjustment of the wedge. Another object of the invention has been to provide a wedge construction in which all of the parts carrying the pressure of the links are in compression rather than in tension as has been heretofore common, the improved strength of material in compresison being desirable to prevent breakage. Still another object of the invention has been to provide a locking device between the block and crown which allows the use of a knockout without any possibility of the wedge jarring out of adjustment.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various means in which the principle of the invention may be used.

Figure 1:
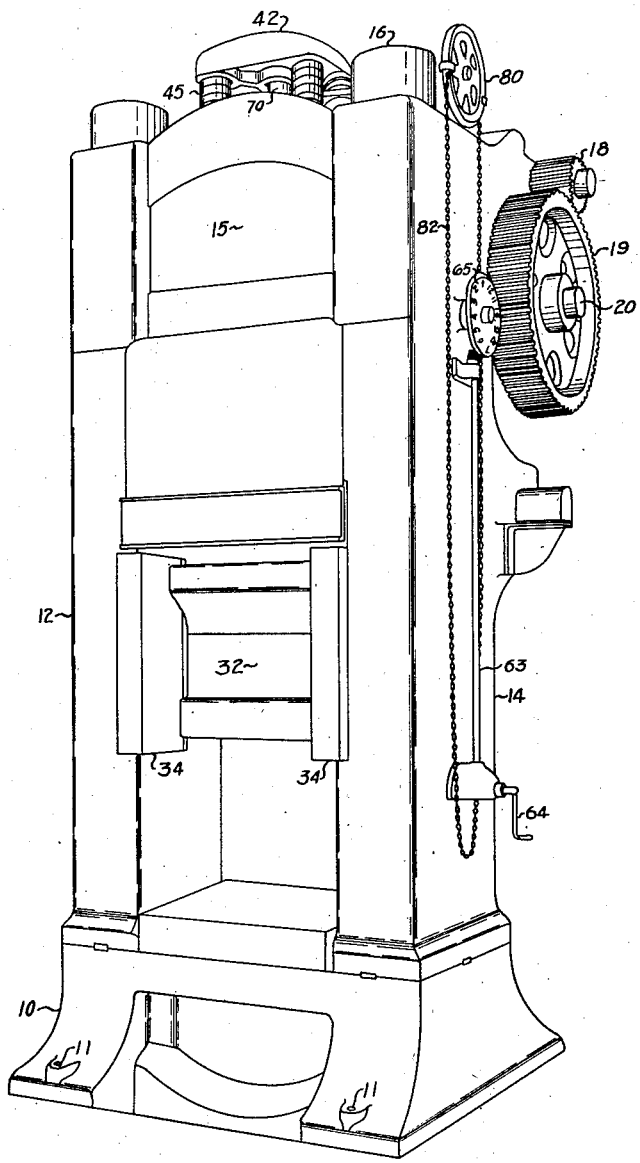
Fig. 1 is a perspective of our improved press showing generally the features thereof.
Figure 4:
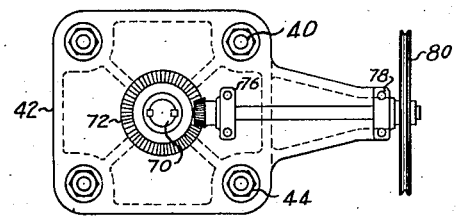
Fig. 4 is a plan view of the crown cap employed to lock the parts in position.

Referring now particularly to Fig. 1, our improved frame comprises a bed 10 bolted as at 11 to a suitable foundation. Carried by the bed are a pair of uprights 12 and 14, which at their upper portions support a crown 15 spanning them. Heavy tie rods (not shown) pass through the bed, crown and uprights at the four corners of the machine. Tie rod nuts 16 engage the rods and bear against the crown to hold the parts of the frame in fixed relation to each other.

The press is driven by an electric motor normally mounted on top of the crown, which drives a pinion 18 on a clutch shaft in mesh with a gear 19 on a back shaft 20. Carried on the opposite side of the frame by the shaft 20 is a pinion 22 which drives a large bull gear 23 supported on a crankshaft 25. A clutch to start and stop the press is mounted on the clutch shaft.

The crankshaft supports one end of a connecting rod or member 27 which at its other end is mounted at the pivot of a toggle composed of two links 29 and 30. The lower link 30 is pivotally connected to a die slide 32 which reciprocates in the frame in ways 34 to work on the material being processed.

A block 36 is vertically slidable in ways 37 of the uprights and receives the free end of the link 29. This block, as hereinafter more fully described, is mounted to absorb the working pressure from the crankshaft and transmit the same to the press frame, adjustment being provided to vary the position of the pivotal axis of the block and its associated toggle with respect to the frame.

To support the block from the crown four vertical holes are provided in the latter which slidingly receive studs 40 threadingly secured at their lower ends in the block 36.

A crown cap 42 is mounted above the crown and is provided with four holes in registration with crown holes to receive the studs 40 which are each capped with a nut 44. Thus the block is hung from the crown cap. Heavy compression springs 45 surround each stud and bear at one end in a recess in the crown cap and at the other end in a recess in the crown to resiliently urge the crown cap upwardly lifting the block 36 against the under part of the crown.

Figure 5:
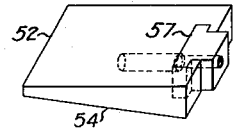
Fig. 5 is a perspective of the wedge and its adjusting screw.
Figures 2, 3:
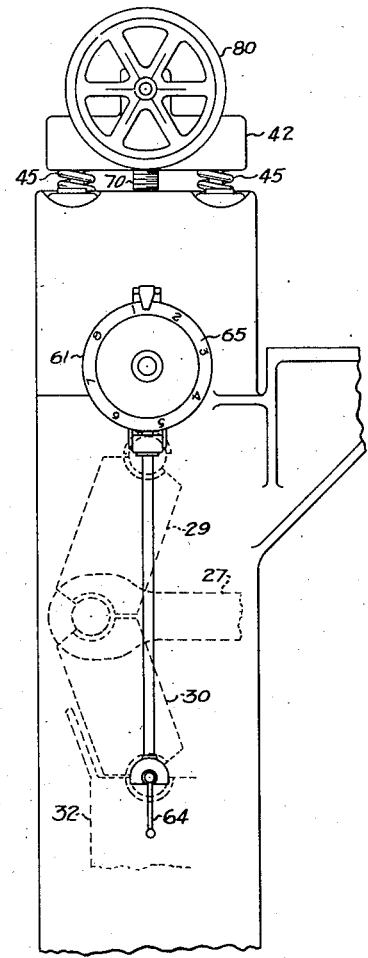
Fig. 2 is a fragmentary front elevation showing a portion of the crown and block broken away to reveal the wedge construction.
Fig. 3 is a side elevation of the upper portion of our improved press.

The wedge mechanism, best shown in Fig. 2, limits the movement of the block toward the crown. To this end a slideway is provided extending parallel to the front face of the press or expressed in another way, a slideway which is parallel to the crankshaft axis. The slideway is located wholly between the downwardly depending portions 48 of the crown which are keyed to the uprights as at 50. Thus each end of the slideway is overhung by the crown casting structure which offers great resistance if a wedge tends to fly out of the slideway. The wedge member 52 is mounted in the slideway with its upper face parallel to the slideway and to the crankshaft axis. The lower face of the wedge is provided at 54 with a slight taper, as shown in Figs. 2 and 5, which taper registers with a corresponding taper formed on the upper portion of the block 36. It will be apparent that if the wedge is moved transversely in its guideway, the position of the block 36 will be changed with respect to the crown.

Adjustment of the wedge is effected by a wedge screw 55 lying parallel to the wedge slideway. The wedge is drilled to receive one end of the screw and is further provided with a nut 57 threadingly engaging the screw by which the wedge is moved on rotation of the screw. The nut is shiftable vertically in the wedge but not in the direction of the wedge slideway axis. Transverse bodily movement of the screw is prevented by an annular shoulder 58 bearing against the inner side of the crown in a recess thereof and by a clamping ring 60 on the outer face of the crown opposite the shoulder 58.

The screw is rotated to shift the wedge by means of a pair of bevel gears 61 and 62, the former carried by the screw and the latter by a vertical shaft 63 lying along the side of the right-hand upright (Fig. 2). At its lower end this shaft terminates in a bevel gear which engages a mating gear on a handle 64. A graduated dial 65 indicates the degree of adjustment of the wedge. Thus as the handle is turned, the screw is rotated and the wedge 52 is shifted in its slideway to vary the distance between the block and crown.

The block and crown are locked against motion with respect to each other during operation of the press. For this purpose a lock bolt 70 is threadingly mounted in the center of the crown cap and bears at its end at 71 against the crown. On the upper side of the cap the lock bolt has keyed thereto a bevel gear 72 which meshes with a similar gear 74 mounted on a shaft 75. The shaft in turn is rotatably mounted at 76 and 78 in the crown cap and terminates at the right-hand side of the machine (Fig. 2) in a chain wheel 80. A chain 82 passes over the wheel and hangs down the side within easy reach of the operator.

By rotating the wheel 80 in the proper direction, the lock bolt may be forced downwardly against the crown sufficient to raise the crown cap, the studs 40 and the block until the latter is tight against the wedge 52. At this time, for practical purposes, the block is integral with the crown and there can be no jarring of the wedge or any loss of adjustment during operation of the press.

Adjustment of the block with respect to the crown is effected by backing off the lock bolt 70 through manipulation of the chain 82 until the cap and block are supported solely by the springs 45. Then, as the hand crank 64 is turned, the wedge 52 may be moved to the left (Fig. 2) to force the block downwardly or to the right to allow the springs 45 to raise the block. After the proper adjustment has been effected as indicated by the dial 65 the lock bolt 70 is turned tightly against the crown to pull the block against the crown and lock the parts for operation of the press.

From the foregoing description, it will be seen that we have provided an improved block and crown construction for knuckle joint presses and the like which is susceptible of easy adjustment and which may be securely locked when adjusted to retain the block and crown firmly fixed with respect to each other as long as desired.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In a press, a frame, a pair of uprights, a crown surmounting said uprights, a die slide slidable between said uprights, a block adapted to be carried between said uprights and beneath said crown, vertical passages through said crown, rods passing through said passages and secured to said block, a cap with passages corresponding to the passages in said crown, springs surrounding each rod and interposed between the cap and crown, means on said rods to hold the same in position to support said block from said cap and means to lock said cap against downward movement with respect to said frame.

2. In a knuckle joint press, a frame, a pair of arms thereon, a crankshaft, a connecting rod carried thereby, a pair of toggle links connected thereto, a die slide connected to one of said links, a block carried by said frame and operatively connected to the other link, a wedge interposed between the block and a frame to transfer the force of said link to said frame, and a slideway between said arms extending in a direction parallel to the axis of said crankshaft to receive said wedge, and means for actuating said wedge away from one and towards the other of said uprights.

3. In a knuckle joint press, a frame, a crankshaft, a connecting rod carried thereby, a pair of toggle links connected thereto, a die slide connected to one of said links, a block carried by said frame and operatively connected to the end of the other link, a wedge member interposed between the block and a frame element to transfer the force of said link to said frame, a slideway to receive said wedge extending in a direction parallel to the axis of said crankshaft, vertical passages through said crown, members passing through said passages and secured to said block, a cap with passages aligned with the crown passages and carried thereabove and engaged by said members to support said crown, springs interposed between said cap and said crown to act against said cap to retain said block against said wedge and means to lock said cap against downward movement with respect to said frame.

4. In a press, a frame, a pair of uprights, a crown extending across said uprights, a die slide slidable between said uprights, a block mounted for vertical movement between said uprights and beneath said crown, a plurality of spaced vertical passages extending through said crown from top to bottom, studs passing through said passages and secured at one end to said block, a cap mounted above said crown with passages corresponding to the passages in said crown, compression springs surrounding each stud and interposed between the cap and crown to normally support the former above the latter, a lock bolt threadingly secured to said cap and adapted to be screwed downwardly against the top of said crown, to lock said block and said crown together as a unit.

5. In a press, a frame, a pair of uprights, a crown extending across said uprights, a die slide slidable between said uprights, a block mounted for vertical movement between said uprights and beneath said crown, four rectangularly spaced vertical passages extending through said crown from top to bottom, studs passing through said passages and secured at one end to said block, a cap mounted above said crown with passages corresponding to the passages in said crown, compression springs surrounding each stud and interposed between the cap and crown to normally support the former above the latter, a lock bolt threadingly secured in said cap intermediate said cap passages and adapted to be screwed downwardly against the top of said crown, a bevel gear keyed to said lock bolt, a horizontal shaft mounted in said cap, a bevel gear carried by said shaft and engaging said first bevel gear and means to rotate said shaft.

6. In a press, a bed, a pair of uprights, a crown surmounting said uprights, a die slide slidable between said uprights, a block adapted to be carried between said uprights and beneath said crown, linkage connecting said slide and said block, a cap above said crown, a member connecting said block and said cap, and resilient means urging separation of said cap and said crown, and adjustable rigid means separating said cap and said crown.

7. In a press, a frame, a die slide operatively mounted in said frame, a block movable in said frame, linkage interconnecting said slide and said block, means to adjustably position said block with respect to said frame, a resilient mounting to support said block, means to positively lock the block with respect to said frame, and gear means to control said last-named means.

8. In a knuckle joint press, a bed, a pair of spaced uprights thereon, a crown on said uprights, a pair of toggle links, a die slide connected to one of said links, a block carried between said uprights and operatively connected to the other link, a slideway on said crown extending between and terminating short of said uprights, a wedge reciprocably slidable on said slideway from one of said uprights towards the other and interposed between the block and crown to transfer the force of said links to said crown, a screw member carried by and projecting through one of said uprights and engaging said wedge to shift the same and means to rotate said screw mounted on that side of said last-named one of said uprights which is remote from the other of said uprights and terminating adjacent said bed.

9. In a press, a frame having a crown, a die slide movable relatively to said frame, a block movable relatively to said frame, linkage connecting said slide and said block, a cap above said crown, a stud connecting said block and said cap, and a lock bolt between said cap and said frame threadingly engaging one and abutting the other of them for locking said block with respect to said frame.

10. In a knuckle joint press, a frame including a crown and a pair of uprights, a pair of toggle links, a die slide carried by said frame and connected to one of said links, a block carried by said frame and connected to the other of said links, said crown having a slideway between said uprights, a wedge reciprocably slidable on said slideway away from one of said uprights and toward the other of said uprights, and means projecting through one upright for actuating said wedge whereby said wedge is exteriorly adjustable.

11. In a press, a bed, a crown, a pair of uprights connecting said bed and said crown, a die slide, a block, linkage connecting said slide and said block, a cap above said crown, a member connecting said block and said cap, adjustable rigid means separating said cap and said crown, said means disposed adjacent said bed for adjusting said means.

12. In a knuckle joint press, a bed, a pair of spaced uprights thereon, a crown on said uprights, a pair of toggle links, a die slide connected to one of said links, a block carried between said uprights and operatively connected to the other link, a slideway on said crown extending between and terminating short of said uprights, a wedge reciprocably slidable on said slideway from one of said uprights toward the other and interposed between the block and crown to transfer the force of said links to said crown, a nut vertically slidable in said wedge, a screw member carried by and projecting through one of said uprights and engaging said nut to shift the same and the wedge, and means to rotate said screw mounted on that side of the last-named one of said uprights which is remote from the other of said uprights and terminating adjacent said bed.

13. In a knuckle joint press, a bed, a pair of spaced uprights thereon, a crown on said uprights, a pair of toggle links, a die slide connected to one of said links, a block carried between said uprights and operatively connected to the other link, a slideway on said crown extending between and terminating short of said uprights, a wedge reciprocably slidable on said slideway from one of said uprights towards the other and interposed between the block and crown to transfer the force of said links to said crown, a screw member carried by and projecting through one of said uprights and engaging said wedge to shift the same, means to rotate said screw mounted on that side of said last-named one of said uprights which is remote from the other of said uprights and terminating adjacent said bed, said means including a vertically disposed shaft lying parallel to said last-mentioned upright and extending toward the bed, and hand operated means adjacent said bed for rotating said shaft.

ADOLPH SEIDEL.
ARTHUR H. SCHLOZ.